United States Patent
Ikeda et al.

(10) Patent No.: US 11,476,023 B2
(45) Date of Patent: Oct. 18, 2022

(54) FERRITE SINTERED MAGNET

(71) Applicant: TDK CORPORATION, Tokyo (JP)

(72) Inventors: Masanori Ikeda, Tokyo (JP); Hiroyuki Morita, Tokyo (JP); Yoshitaka Murakawa, Tokyo (JP); Shogo Muroya, Toyko (JP)

(73) Assignee: TDK CORPORATION, Tokyo (JP)

( * ) Notice: Subject to any disclaimer, the term of this patent is extended or adjusted under 35 U.S.C. 154(b) by 49 days.

(21) Appl. No.: 17/207,085

(22) Filed: Mar. 19, 2021

(65) Prior Publication Data
US 2021/0296032 A1 Sep. 23, 2021

(30) Foreign Application Priority Data

Mar. 23, 2020 (JP) .............. JP2020-051876

(51) Int. Cl.
*H01F 1/34* (2006.01)
*C01G 51/00* (2006.01)
*H01F 1/11* (2006.01)
*C04B 35/26* (2006.01)
*H01F 1/10* (2006.01)

(52) U.S. Cl.
CPC ............ *H01F 1/344* (2013.01); *C01G 51/70* (2013.01); *C04B 35/2633* (2013.01); *H01F 1/10* (2013.01); *H01F 1/11* (2013.01); *C01P 2002/52* (2013.01); *C01P 2002/60* (2013.01); *C01P 2002/76* (2013.01); *C01P 2004/03* (2013.01); *C01P 2006/42* (2013.01); *C04B 2235/3206* (2013.01); *C04B 2235/3409* (2013.01); *C04B 2235/767* (2013.01); *C04B 2235/786* (2013.01); *C04B 2235/788* (2013.01)

(58) Field of Classification Search
CPC ......... H01F 1/10; H01F 1/11; C04B 35/2633; C04B 2235/767; C04B 2235/3206; C04B 2235/3409; C04B 2235/788; C04B 2235/786
See application file for complete search history.

(56) References Cited

U.S. PATENT DOCUMENTS

| 6,139,766 A | 10/2000 | Taguchi et al. |
| 2006/0091352 A1 | 5/2006 | Nagaoka et al. |
| 2015/0221424 A1 | 8/2015 | Kobayashi et al. |
| 2021/0296030 A1* | 9/2021 | Morita ................. H01F 1/10 |

FOREIGN PATENT DOCUMENTS

| CN | 104230323 A | 12/2014 |
| CN | 104692785 A | 6/2015 |
| JP | 4543849 B2 | 9/2010 |
| JP | 5521622 B2 | 6/2014 |
| WO | 98/38654 A1 | 9/1998 |

OTHER PUBLICATIONS

Feb. 8, 2022, Office Action issued in Indian Patent Application No. 202144010543.

* cited by examiner

*Primary Examiner* — C Melissa Koslow
(74) *Attorney, Agent, or Firm* — Oliff PLC

(57) ABSTRACT

A ferrite sintered magnet including ferrite grains having a hexagonal crystal structure. The ferrite grains satisfy $0.56 \leq W \leq 0.68$ where W is an average value of circularities of the ferrite grains in a cross section parallel to an axis of easy magnetization.

6 Claims, 1 Drawing Sheet

FERRITE SINTERED MAGNET

TECHNICAL FIELD

The present disclosure relates to a ferrite sintered magnet.

BACKGROUND

Patent Documents 1 and 2 disclose ferrite sintered magnets having a constitution in which Fe is partly replaced with Mg. Thereby, the ferrite sintered magnets of Patent Documents 1 and 2 attain improved magnetic properties.

[Patent Document 1] Japanese Patent No. 5521622
[Patent Document 2] Japanese Patent No. 4543849

SUMMARY

An object of an aspect of the present invention is to obtain a ferrite sintered magnet having an improved residual magnetic flux density Br while maintaining a high coercive force HcJ.

In response to achieve the above object, a ferrite sintered magnet of an aspect of the present invention includes ferrite grains having a hexagonal crystal structure, in which the ferrite grains satisfy $0.56 \leq W \leq 0.68$ where W is an average value of circularities of the ferrite grains in a cross section parallel to an axis of easy magnetization.

The ferrite sintered magnet of an aspect of the present invention has an improved Br while maintaining a high HcJ.

An average value of Heywood diameters of the ferrite grains in the cross section may be 1.00 μm or more and 1.23 μm or less.

The ferrite sintered magnet may include 0.010 mass % or more and 0.090 mass % or less of Mg in terms of MgO.

The ferrite sintered magnet may include Ca, R, A, Fe, and Co in an atomic ratio of $Ca_{1-w-x}R_wA_xFe_zCo_m$, in which R may include La only or may include La and at least one selected from rare earth elements, A may be at least one selected from Ba and Sr, $0.364 \leq w \leq 0.495$, $0.038 \leq x \leq 0.136$, $8.280 \leq z \leq 10.45$, and $0.257 \leq m \leq 0.338$.

The ferrite sintered magnet including Ca, R, A, Fe, and Co, in which

R may include La only or may include La and at least one selected from rare earth elements, A may be at least one selected from Ba and Sr, Ca may be 2.505 mass % or more and 2.951 mass % or less in terms of CaO, R may be 8.028 mass % or more and 8.239 mass % or less in terms of $R_2O_3$, A may be 0.666 mass % or more and 1.666 mass % or less in terms of AO, Fe may be 84.564 mass % or more and 84.937 mass % or less in terms of $Fe_2O_3$, and Co may be 2.341 mass % or more and 2.521 mass % or less in terms of CoO.

The ferrite sintered magnet may include 0.005 mass % or more and 0.058 mass % or less of B in terms of $B_2O_3$.

DETAILED DESCRIPTION

Hereinafter, a ferrite sintered magnet according to an embodiment of the present invention will be described below.

The ferrite sintered magnet includes the ferrite grains and grain boundaries. A ferrite grain is a crystal grain having a hexagonal crystal structure. The crystal grain may have a magnetoplumbite-type crystal structure.

The ferrite grains contained in the ferrite sintered magnet satisfies $0.56 \leq W \leq 0.68$ where W is an average value of circularities of the ferrite grains in a cross section parallel to an axis of easy magnetization. The smaller the circularities of the ferrite grains are, the higher the flatness of the ferrite grains is, and the shape of the ferrite grains are closer to a plate shape. As a result, the ferrite grains are easily oriented in a fixed direction and a direction of magnetization is oriented in the fixed direction. Then, a degree of magnetic field orientation increases, and Br improves. However, if W is too small, the ferrite grains become flatter. As the ferrite grains become flatter, the ferrite grains tend to become large easily. Then, the large flattened ferrite grains are likely to become multi-domain grains. A multi-domain grain is a grain having a plurality of magnetic domains in one grain. When a ratio of the multi-domain grains in the ferrite grains increases, the degree of magnetic field orientation decreases and Br decreases. Also, a reverse magnetic field increases and HcJ decreases. Therefore, when W is within the above range, Br can be improved while maintaining a high HcJ. In addition, the ferrite grains contained in the ferrite sintered magnet may satisfy $0.58 \leq W \leq 0.67$ or may satisfy $0.60 \leq W \leq 0.66$.

Hereinafter, the method of calculating the average value of circularities will be described below.

In the present embodiment, $4\pi S/L^2$ is the circularity of the ferrite grain where S is an area of the ferrite grain in the cross section parallel to the axis of easy magnetization and L is a peripheral length of the ferrite grain in the cross section parallel to the axis of easy magnetization. When the ferrite grain is a circle, the circularity is 1 which is the maximum value; and as the ferrite grain becomes flatter, the circularity approaches to 0. Then, the circularity of each ferrite grain is calculated and then an average is calculated to obtain the average value of the circularities.

Figure 1A:
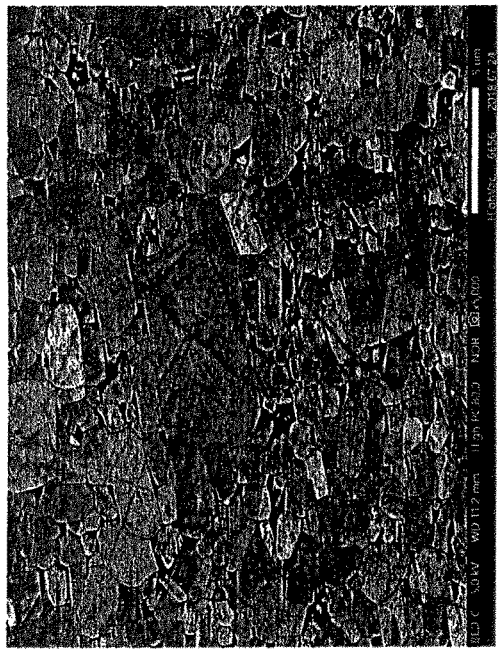
FIG. 1A is an SEM image of Example 3.
Figure 2A:
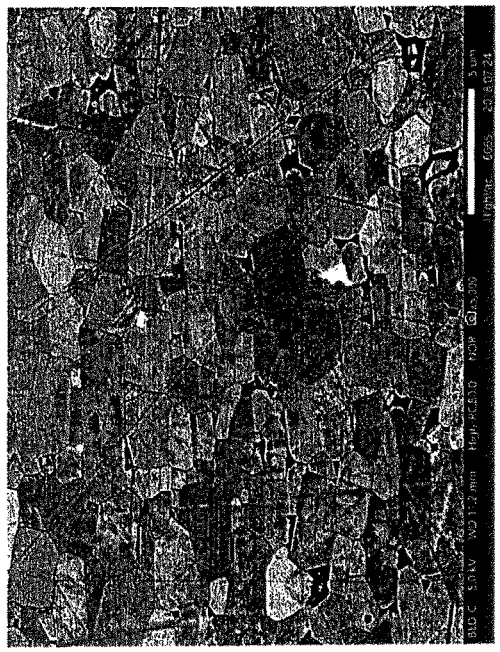
FIG. 2A is an SEM image of Comparative Example 1.

Specifically, first, an SEM image such as shown in FIG. 1A and FIG. 2A is photographed in the cross section parallel to the axis of easy magnetization. A size of the SEM image is not particularly limited, but the size includes at least 100 ferrite grains. A plurality of SEM images may be observed, and a total number of the ferrite grains contained in each SEM image may be at least 100. A magnification of the SEM image is not particularly limited, as long as the circularity of each ferrite grain can be measured.

Figure 1B:
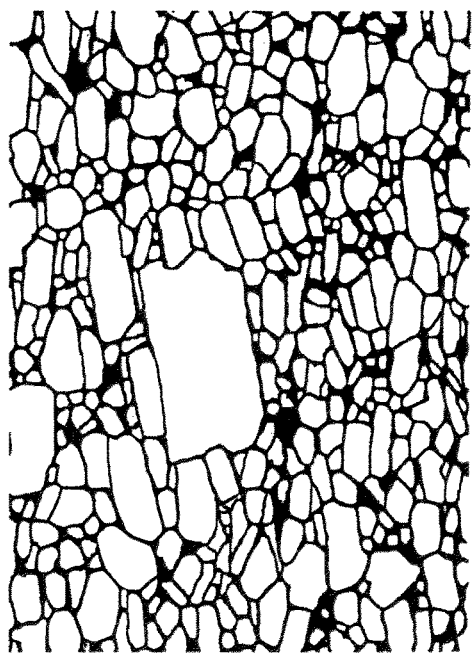
FIG. 1B is an analysis image obtained from FIG. 1A.
Figure 2B:
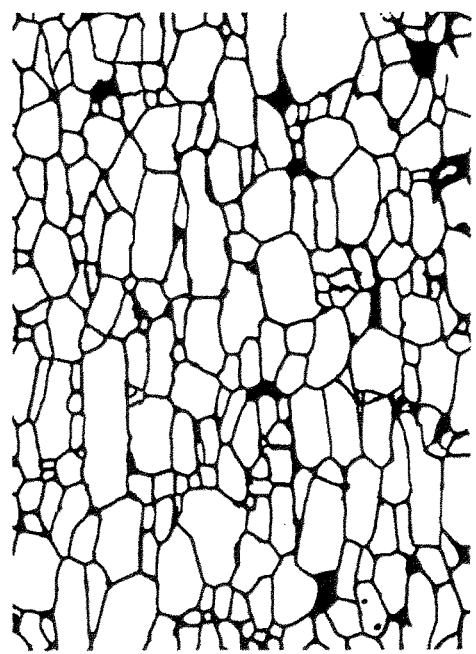
FIG. 2B is an analysis image obtained from FIG. 2A.

Next, the SEM image is analyzed by using Deep Neural Network (DNN) to obtain an analysis image which is binarized into the ferrite grains and the grain boundaries. FIG. 1B is the analysis image obtained from the SEM image of FIG. 1A. FIG. 2B is the analysis image obtained from the SEM image of FIG. 2A. Then, the circularity of each ferrite grain completely included in the analysis image is calculated by performing image processing using Open Source Computer Vision Library (Open CV). Then, by calculating an average of the circularities of the ferrite grains, an average value of the circularities is obtained.

The grain size of the ferrite grains is not particularly limited, and the average value of Heywood diameter of the above circularity calculated ferrite grains may be 0.87 μm or more and 1.60 μm or less, and may be 1.00 μm or more and 1.23 μm or less.

Generally, the magnetic properties of the ferrite sintered magnets tend to improve as the grain sizes of the ferrite grains are reduced. However, it is difficult to produce a ferrite sintered magnet containing small sized ferrite grains. Therefore, from the viewpoint of reducing a production cost, the ferrite grain size may be large. The average value of Heywood diameters of the ferrite grains contained in the ferrite sintered magnet is within the above range. Thus, it becomes easier to improve Br and HcJ while reducing the production cost.

Heywood diameter is a circle equivalent diameter of a projected area. Heywood diameter of the ferrite grains is $(4S/\pi)^{1/2}$.

A density (df) of the ferrite sintered magnet is not particularly limited. For example, df measured by Archimedes method may be 5.0600 g/cm$^3$ or more and 5.1500 g/cm$^3$ or less. When df is within the above range, particularly when df is 5.0600 g/cm$^3$ or more, Br tends to be good.

A composition of the ferrite sintered magnet is not particularly limited. The ferrite sintered magnet may include Mg in terms of MgO within a range of 0.010 mass % or more and 0.090 mass % or less; 0.020 mass % or more and 0.070 mass % or less; or 0.034 mass % or more and 0.052 mass % or less when a total amount of the ferrite sintered magnet is 100 mass %. By including Mg within the above range, it becomes easy to suitably control the average value W of circularities of the ferrite grains, and it becomes easy to improve Br while maintaining a high HcJ. Further, Mg is non-magnetic. Therefore, the magnetic properties tend to deteriorate easily when Mg content is too large.

A composition other than Mg is not particularly limited and as long as the composition can produce the ferrite grains having hexagonal crystal structures. The composition may include calcium (Ca), R, A, iron (Fe) and cobalt (Co) in an atomic ratio of $Ca_{1-w-x}R_wA_xFe_zCo_m$. R may include lanthanum (La) only or may include La and at least one selected from rare earth elements. A is at least one selected from barium (Ba) and strontium (Sr). In the above composition, w, x, z, and m may satisfy the following ranges: $0.364 \leq w \leq 0.495$, $0.038 \leq x \leq 0.136$, $8.280 \leq z \leq 10.45$, and $0.257 \leq m \leq 0.338$.

R content (w) may satisfy $0.415 \leq w \leq 0.485$ or $0.459 \leq w \leq 0.474$. A content (x) may satisfy $0.046 \leq x \leq 0.128$ or $0.054 \leq x \leq 0.120$. Fe content (z) may satisfy $9.100 \leq z \leq 10.20$ or $9.837 \leq z \leq 9.934$. Co content (m) may satisfy $0.278 \leq m \leq 0.327$ or $0.293 \leq m \leq 0.311$.

Further, 90 at % or more of La may be included when a total content of R is 100 at %. When the ratio of La to R is within the above range, a magnetic anisotropy is easily improved. Further, R may be La only. As a result, the number of elements can be reduced, and the production load and the production cost can be reduced.

When the composition is expressed in a mass ratio in terms of oxides, and a total mass of the ferrite sintered magnet is 100 mass %, the composition may include R, including La only or including La and at least one selected from rare earth elements, A, at least one selected from Ba and Sr, 2.505 mass % or more and 2.951 mass % or less of Ca in terms of CaO, 8.028 mass % or more and 8.239 mass % or less of R in terms of $R_2O_3$, 0.666 mass % or more and 1.666 mass % or less of A in terms of AO, 84.564 mass % or more and 84.937 mass % or less of Fe in terms of $Fe_2O_3$, and 2.341 mass % or more and 2.521 mass % or less of Co in terms of CoO.

A is at least one element selected from a group including Ba and Sr. As A, the ferrite sintered magnet may include both Ba and Sr or may include Ba only or Sr only.

High Br and HcJ are easily obtained, when a content of each of Ca, R, A, Fe, and Co are within the above ranges.

The composition may further include boron (B) within a range of 0.005 mass % or more and 0.058 mass % or less, 0.015 mass % or more and 0.048 mass % or less, or 0.022 mass % or more and 0.041 mass % or less in terms of boron oxide ($B_2O_3$). Br and HcJ are easily improved by including B within the above range.

The composition may further include aluminum (Al) within a range of 0.010 mass % or more and 0.160 mass % or less, 0.035 mass % or more and 0.110 mass % or less, or 0.049 mass % or more and 0.065 mass % or less in terms of aluminum oxide ($Al_2O_3$). Br and HcJ tend to easily improve by including Al within the above range.

The composition may further include silicon (Si) within a range of 0.102 mass % or more and 0.752 mass % or less, 0.224 mass % or more and 0.603 mass % or less, or 0.315 mass % or more and 0.353 mass % or less in terms of silicon oxide ($SiO_2$). Br and HcJ tend to easily improve by including Si within the above range.

The composition may further include manganese (Mn) within a range of 0.010 mass % or more and 0.450 mass % or less, 0.220 mass % or more and 0.439 mass % or less, or 0.288 mass % or more and 0.341 mass % or less in terms of manganese oxide (MnO). Br and HcJ tend to easily improve by including Mn within the above range.

Hereinafter, a method for producing the ferrite sintered magnet will be described below.

The following embodiment is an example of the method for producing the ferrite sintered magnet. According to the present embodiment, the ferrite sintered magnet may be produced through a blending step, a calcination step, a pulverization step, a compacting step, and a firing step. Each step will be described below.

<Blending Step>

In the blending step, raw materials of the ferrite sintered magnet are blended to obtain a raw material mixture. As the raw materials of the ferrite sintered magnet, a compound (a raw material compound) containing one or more of the elements constituting the raw material mixture may be mentioned. The raw material compound may be, for instance, in a powder form.

Examples of the raw material compound include oxides of each element, or compounds (carbonates, hydroxides, nitrates, etc.) which become oxides by firing may be mentioned. For example, $CaCO_3$, $La_2O_3$, $SrCO_3$, $BaCO_3$, $Fe_2O_3$, $Co_3O_4$, MgO, $B_2O_3$, $Al_2O_3$, $SiO_2$, MnO, etc. may be mentioned. An average grain size of the powder of the raw material compound may be 0.1 μm to 2.0 μm or so.

For example, in order to perform blending, each of the raw materials is weighed so that a desired ferrite magnetic material composition is obtained. Then, the weighed raw materials may be mixed and pulverized for 0.1 to 20 hours or so using a wet attritor, a ball mill, etc. During this blending step, it is not necessary to mix all of the raw materials, and a part of the raw materials may be added after the calcination step described below.

<Calcination Step>

In the calcination step, the raw material mixture obtained in the blending step is calcined. The calcination may be performed, for example, in oxidizing atmosphere such as in the air. A calcination temperature may be within a temperature range of 1100° C. to 1300° C. A calcination time may be 1 second to 10 hours.

A primary grain size of the calcined body obtained by calcining may be 10 µm or less.

<Pulverization Step>

The calcined body which has been formed into a granular or an aggregate form in the calcination step is pulverized into a powder form in the pulverization step. Thereby, it becomes easy to perform compacting in the later described compacting step. In the pulverization step, as mentioned in above, the raw materials which has not blended in the blending step may be added (post-addition of the raw materials). The pulverization step may be performed, for example, in a two-step process in which the calcined body is pulverized into a coarse powder (a coarse pulverization) and then further finely pulverized (a fine pulverization).

The coarse pulverization is carried out, for example, until the average grain size becomes 0.5 µm to 10.0 µm by using a vibration mill, etc. In the fine pulverization, the coarsely pulverized material obtained by the coarse pulverization is further pulverized by a wet attritor, a ball mill, a jet mill, etc.

The fine pulverization may be carried out until the average grain size of the obtained fine grain size is 0.08 µm to 1.00 µm or so. The specific surface area of the finely pulverized powder (e.g. determined by a BET method) can be 4 m$^2$/g to 12 µm$^2$/g or so. A pulverizing time varies depending on a pulverizing method. For example, it may be 30 minutes to 20 hours or so in case of using a wet attritor, and it may be 1 to 50 hours or so in case of wet pulverizing with a ball mill.

In case of a wet method, an aqueous solvent such as water or a non-aqueous solvent such as toluene, xylene, or the like may be used as a dispersion medium in the fine pulverization step. A high orientation tends to be obtained in the below described wet pressing when the non-aqueous solvent is used. On the other hand, it is advantageous from the point of productivity when the aqueous solvent such as water is used.

To increase the degree of orientation of the sintered body obtained after firing, for example, a known polyhydric alcohol or a dispersant may be added.

<Compacting Step and Firing Step>

In the compacting and the firing step, the pulverized material (may be the finely pulverized material) obtained after the pulverization step is compacted to obtain a green compact. Then, a sintered body is obtained after firing the green compact. Compacting may be performed by any of dry pressing, wet pressing, and Ceramic Injection Molding (CIM).

In a dry pressing method, for example, a magnetic field is applied while pressure compacting the dried magnetic powder to form a green compact, and then the green compact is fired. Generally, a dry pressing method has an advantage that the time required for the compacting step is short because the dried magnetic powder is pressure compacted in the press mold.

In a wet pressing method, for example, a slurry containing magnetic powder is pressure compacted in a magnetic field while the liquid component is removed to form a green compact, and then the green compact is fired. A wet pressing method is advantageous because the magnetic powder is easily oriented by the magnetic field during compacting, and the preferable magnetic properties of the sintered magnet can be obtained.

In a compacting method using CIM, the dried magnetic powder is heated and kneaded together with a binder resin to obtain pellets. The formed pellets are injection molded in the mold to which a magnetic field is applied. Thereby, a preliminary green compact is obtained. The preliminary green compact is subjected to a binder removal treatment and then fired.

Hereinafter, wet pressing will be described in detail.

(Wet Pressing and Firing)

When obtaining the ferrite sintered magnet by a wet pressing method, a slurry is obtained by carrying out the above-mentioned fine pulverization step using a wet method. The slurry is concentrated to a predetermined concentration to obtain a slurry for wet pressing. Compacting may be performed using the slurry.

The slurry can be concentrated by a centrifugation, a filter press, etc. The content of the finely pulverized powder in the slurry for wet pressing may be 30 mass % to 80 mass % or so in a total amount of the slurry for wet pressing.

In the slurry, water may be used as a dispersion medium for dispersing the finely pulverized powder. In this case, a surfactant such as gluconic acid, gluconate, sorbitol, etc. may be added to the slurry. A non-aqueous solvent may be used as the dispersion medium. As the non-aqueous solvent, an organic solvent such as toluene, xylene, etc. may be used. In this case, a surfactant such as oleic acid may be added.

A slurry for wet pressing may be prepared by adding a dispersion medium and the like to the finely pulverized powder in a dry state after the fine pulverization.

Next, in wet pressing, the slurry for wet pressing is compacted in a magnetic field. The compacting pressure may be set to 9.8 MPa to 98 MPa (0.1 ton/cm$^2$ to 1.0 ton/cm$^2$) or so. A magnetic field applied may be 400 kA/m to 1600 kA/m or so. A direction of pressure applied and a direction of the magnetic field applied during compacting may be in the same direction or in orthogonal directions.

A green compact obtained by wet pressing can be fired in oxidizing atmosphere such as in the air and the like. A firing temperature may be 1050° C. to 1270° C. A firing time (a length of time holding at the firing temperature) may be 0.5 hours to 3 hours or so.

When the green compact is obtained by wet pressing, before reaching to the firing temperature, the green compact can be heated from a room temperature to approximately 100° C. at a temperature increasing rate of 2.5° C./minute or so. By sufficiently drying the green compact, cracks can be suppressed from forming.

Further, when a surfactant (dispersant) and the like are added, for example, heating may be carried out within a temperature range of 100° C. to 500° C. or so at a temperature increasing rate of 2.0° C./min or so. As a result, the surfactant and the like can be sufficiently removed (degreasing treatment). These treatments may be performed at the beginning of the firing step or separately before the firing step.

Although the preferred method for producing the ferrite sintered magnet has been described in above, the method for producing the ferrite sintered magnet is not limited to the above, and conditions of production may be appropriately modified.

The shape of the ferrite sintered magnet obtained by the present embodiment is not limited as long as it has a ferrite composition of the present invention. For example, the ferrite sintered magnet may have various shapes, such as an arc segment shape, a flat plate shape, a columnar shape, a cylindrical shape, etc., having anisotropy. According to the ferrite sintered magnet of the, regardless of the shape of the magnet, a high Br can be obtained while maintaining a high HcJ.

The ferrite sintered magnet may be used for a general motor, a rotating machine, a sensor, etc.

Examples

Hereinafter, the present embodiment will be described in detail with reference to examples, however, the present embodiment is not limited thereto.

<Blending Step>

As starting raw materials, $CaCO_3$, $La_2O_3$, $SrCO_3$, $BaCO_3$, $Fe_2O_3$, $Co_3O_4$, MgO, $B_2O_3$, $Al_2O_3$, $SiO_2$, and MnO were prepared. The raw materials were weighed to have a composition of each sample shown in Tables 1 and 2. Table 1 shows atomic ratios of $Ca_{1-w-x}R_wA_xFe_zCo_m$. Table 2 shows a content of each element in terms of oxide in mass %.

A total content of each sample described in Table 2 does not add up to 100 mass %. This is because components derived from impurities were omitted. The components derived from impurities were $P_2O_5$, $SO_3$, Cl, $K_2O$, $V_2O_5$, $Cr_2O_3$, NiO, CuO, ZnO, $MoO_3$, etc.

The starting raw materials were mixed and pulverized with a wet attritor to obtain a raw material mixture in a slurry form.

<Calcination Step>

After drying the raw material mixture, a calcining treatment was performed which maintained at 1200° C. for 2 hours in the air to obtain a calcined body.

<Pulverization Step>

The obtained calcined body was coarsely pulverized by a rod mill, then a coarsely pulverized material was obtained. Next, a fine pulverization was performed for 28 hours with a wet ball mill to obtain a slurry. The obtained slurry was adjusted to a solid content concentration of 70 to 75 mass % to obtain slurry for the wet pressing.

<Compacting Step and Firing Step>

Next, a preliminary green compact was obtained by using a wet magnetic field pressing machine. The compacting pressure was 50 MPa and the applied magnetic field was 800 kA/m. A direction of pressure applied and a direction of the magnetic field applied during compacting were set to the same direction. The preliminary green compact obtained by wet pressing was a disk shape having a diameter of 30 mm and a height of 15 mm.

The preliminary green compact was fired in the air at 1190° C. to 1230° C. for 1 hour, and then a sintered body of a ferrite sintered magnet was obtained.

A fluorescent X-ray quantitative analysis was performed on each ferrite sintered magnet. It was confirmed that each ferrite sintered magnet had the composition shown in Tables 1 and 2.

Further, it was confirmed by an X-ray diffraction measurement that the ferrite grains of each ferrite sintered magnet in Tables 1 and 2 had hexagonal crystal structure.

<Measurement of Magnetic Properties (Br, HcJ)>

In Examples 1 to 3 and Comparative Examples 1 to 3, upper and lower surfaces of each ferrite sintered magnet were processed. Then, magnetic properties of the processed magnets were measured in the air at 25° C. using a BH tracer with a maximum applied magnetic field of 1989 kA/m. The results are shown in Table 1.

<Measurement of Density (df)>

The densities of the ferrite sintered magnets of Examples 1 to 3 and Comparative Examples 1 to 3 were measured by Archimedes method. The results are shown in Table 1.

<Average Value W of Ferrite Grain Circularity and Average Value of Heywood Diameter>

First, in a cross section parallel to an axis of easy magnetization of each ferrite sintered magnet, SEM images as shown in FIG. 1A and FIG. 2A were taken. FIG. 1A shows Example 3 and FIG. 2A shows Comparative Example 1. A magnification was set to 5000× and a SEM image of 26 μm×19 μm was taken. It was confirmed that each SEM image contained at least 100 ferrite grains.

Then, the image for analysis was created which was binarized into ferrite grains and grain boundaries by analyzing the SEM image using DNN. FIG. 1B is the analysis image obtained from the SEM image of FIG. 1A. FIG. 2B is the analysis image obtained from the SEM image of FIG. 2A. The circularities of the ferrite grains completely included in the analysis image were calculated and an average thereof was taken. Thereby, an average value W of the circularities was obtained. The results are shown in Table 1.

Furthermore, Heywood diameters of the ferrite grains completely included in the analysis image were calculated and an average thereof was taken. Thereby, the average value of Heywood diameters was obtained. The results are shown in Table 1.

TABLE 1

| | Average Value of Circularities: W | Average Value of Heywood Diameter (μm) | MgO (mass %) | Ca(1 − w − x)La(w)A(x)Fe(z)Co(m) | | | | | | | $B_2O_3$ (mass %) | Br (mT) | HcJ (kA/m) | df (g/cm$^3$) |
| --- | --- | --- | --- | --- | --- | --- | --- | --- | --- | --- | --- | --- | --- | --- |
| | | | | Ca 1 − w − x | La w | Ba | Sr | Ba + Sr x | Fe z | Co m | | | | |
| Comp. Ex. 1 | 0.69 | 0.86 | 0.000 | 0.500 | 0.363 | 0.001 | 0.135 | 0.137 | 8.279 | 0.256 | 0.004 | 449 | 326 | 5.0523 |
| Ex. 1 | 0.66 | 1.23 | 0.034 | 0.418 | 0.462 | 0.064 | 0.056 | 0.120 | 9.920 | 0.293 | 0.022 | 464 | 328 | 5.1104 |
| Ex. 2 | 0.63 | 1.00 | 0.045 | 0.451 | 0.474 | 0.068 | 0.007 | 0.075 | 9.934 | 0.304 | 0.041 | 464 | 353 | 5.1108 |
| Ex. 3 | 0.60 | 1.19 | 0.052 | 0.487 | 0.459 | 0.012 | 0.042 | 0.054 | 9.837 | 0.311 | 0.029 | 470 | 363 | 5.0983 |
| Comp. Ex. 2 | 0.55 | — | 0.099 | 0.500 | 0.363 | 0.001 | 0.135 | 0.137 | 8.279 | 0.256 | 0.004 | 446 | 332 | 5.0409 |
| Comp. Ex. 3 | 0.54 | — | 0.205 | 0.500 | 0.363 | 0.001 | 0.135 | 0.137 | 8.279 | 0.256 | 0.004 | 445 | 296 | 5.0378 |

TABLE 2

|  | MgO | $Al_2O_3$ | $SiO_2$ | CaO | MnO | $Fe_2O_3$ mass % | CoO | SrO | BaO | $La_2O_3$ | $B_2O_3$ |
|---|---|---|---|---|---|---|---|---|---|---|---|
| Comp. Ex. 1 | 0.000 | 0.164 | 0.763 | 3.530 | 0.543 | 83.216 | 2.415 | 1.765 | 0.027 | 7.449 | 0.004 |
| Ex. 1 | 0.034 | 0.063 | 0.315 | 2.505 | 0.341 | 84.564 | 2.341 | 0.621 | 1.045 | 8.028 | 0.022 |
| Ex. 2 | 0.045 | 0.049 | 0.353 | 2.695 | 0.304 | 84.590 | 2.426 | 0.074 | 1.120 | 8.239 | 0.041 |
| Ex. 3 | 0.052 | 0.065 | 0.322 | 2.951 | 0.288 | 84.937 | 2.521 | 0.473 | 0.193 | 8.093 | 0.029 |
| Comp. Ex. 2 | 0.099 | 0.164 | 0.762 | 3.526 | 0.542 | 83.134 | 2.412 | 1.763 | 0.027 | 7.442 | 0.004 |
| Comp. Ex. 3 | 0.205 | 0.164 | 0.761 | 3.523 | 0.542 | 83.044 | 2.410 | 1.761 | 0.027 | 7.435 | 0.004 |

According to Tables 1 and 2, Examples 1 to 3 which satisfied $0.56 \leq W \leq 0.68$ where W is an average value of circularities had a good HcJ. When compared with Comparative Examples 1 to 3 which did not satisfy $0.56 \leq W \leq 0.68$, Examples 1 to 3 had a higher Br. Specifically, all Examples had Br of 460 mT or more. Also, all Examples had HcJ of 320 kA/m or more, and Examples 2 and 3 had HcJ of 350 kA/m or more.

What is claimed is:

1. A ferrite sintered magnet comprising ferrite grains having a hexagonal crystal structure, wherein
   the ferrite grains satisfy $0.56 \leq W \leq 0.68$
   where W is an average value of circularities of the ferrite grains in a cross section parallel to an axis of easy magnetization.

2. The ferrite sintered magnet according to claim 1, wherein
   an average value of Heywood diameters of the ferrite grains in the cross section is 1.00 μm or more and 1.23 μm or less.

3. The ferrite sintered magnet according to claim 1 comprising 0.010 mass % or more and 0.090 mass % or less of Mg in terms of MgO.

4. The ferrite sintered magnet according to claim 1 comprising Ca, R, A, Fe and Co in an atomic ratio of $Ca_{1-w-x}R_wA_xFe_zCo_m$, wherein
   R includes La only or includes La and at least one selected from rare earth elements,
   A is at least one selected from Ba and Sr,
   $0.364 \leq w \leq 0.495$,
   $0.038 \leq x \leq 0.136$,
   $8.280 \leq z \leq 10.45$ and
   $0.257 \leq m \leq 0.338$.

5. The ferrite sintered magnet according to claim 1, comprising Ca, R, A, Fe and Co, wherein
   R includes La only or includes La and at least one selected from rare earth elements,
   A is at least one selected from Ba and Sr,
   Ca is 2.505 mass % or more and 2.951 mass % or less in terms of CaO,
   R is 8.028 mass % or more and 8.239 mass % or less in terms of $R_2O_3$,
   A is 0.666 mass % or more and 1.666 mass % or less in terms of AO,
   Fe is 84.564 mass % or more and 84.937 mass % or less in terms of $Fe_2O_3$, and
   Co is 2.341 mass % or more and 2.521 mass % or less in terms of CoO.

6. The ferrite sintered magnet according to claim 1, comprising 0.005 mass % or more and 0.058 mass % or less of B in terms of $B_2O_3$.

* * * * *